(12) United States Patent
Wells et al.

(10) Patent No.: US 11,316,936 B2
(45) Date of Patent: **\*Apr. 26, 2022**

(54) METHODS AND ARCHITECTURE FOR LOAD-CORRECTING REQUESTS FOR SERVERLESS FUNCTIONS

(71) Applicant: Cisco Technology, Inc., San Jose, CA (US)

(72) Inventors: Ian James Wells, San Jose, CA (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,716

(22) Filed: May 28, 2021

(65) Prior Publication Data
US 2021/0320980 A1  Oct. 14, 2021

Related U.S. Application Data

(63) Continuation of application No. 16/846,111, filed on Apr. 10, 2020, now Pat. No. 11,057,480.

(51) Int. Cl.
*H04L 29/02* (2006.01)
*H04L 67/51* (2022.01)
(Continued)

(52) U.S. Cl.
CPC .............. *H04L 67/16* (2013.01); *H04L 41/12* (2013.01); *H04L 67/1019* (2013.01); *H04L 67/28* (2013.01)

(58) Field of Classification Search
CPC ...................................................... H04L 67/16
See application file for complete search history.

(56) References Cited

U.S. PATENT DOCUMENTS 10,331,462 B1   6/2019   Varda et al.
2013/0198388 A1   8/2013   Dahn
(Continued)

OTHER PUBLICATIONS

Batraski, "Introducing Load Balancing Analytics," Cloudfare, Dec. 12, 2019, https://blog.cloudfare.com/introducing-load-balancing-analytics/, pp. 1-80.
(Continued)

*Primary Examiner* — Adnan M Mirza
(74) *Attorney, Agent, or Firm* — Lee & Hayes, P.C.

(57) ABSTRACT

Methods and architecture for load-correcting requests for serverless functions to reduce latency of serverless computing are provided. An example technique exploits knowledge that a given server node does not have a serverless function ready to run or is overloaded. Without further processing overhead or communication, the server node shifts the request to a predetermined alternate node without assessing a current state of the alternate node, an efficient decision based on probability that a higher chance of fulfillment exists at the alternate node than at the current server, even with no knowledge of the alternate node. In an implementation, the server node refers the request but also warms up the requested serverless function, due to likelihood of repeated requests or in case the request is directed back. An example device has a front-end redirecting server and a backend serverless system in a single component.

20 Claims, 10 Drawing Sheets

(51) Int. Cl.
*H04L 41/12* (2022.01)
*H04L 67/1019* (2022.01)
*H04L 67/56* (2022.01)

(56) References Cited

U.S. PATENT DOCUMENTS

2017/0126569 A1     5/2017  Seed et al.
2018/0124194 A1     5/2018  Rajewski
2019/0377604 A1*   12/2019  Cybulski ............... G06F 9/5044
2020/0081745 A1*    3/2020  Cybulski ............. G06F 11/1438

OTHER PUBLICATIONS

Office Action for U.S. Appl. No. 16/846,111, dated Dec. 10, 2020, Wells, "Methods and Architecture for Load-Correcting Requests for Serverless Functions", 12 Pages.
Anonymous: "Cisco Prime Cable Provisioning 6.1.3 User Guide—first three chapters".
PCT Search Report & Written Opinion dated Jul. 2, 2021.

* cited by examiner

METHODS AND ARCHITECTURE FOR LOAD-CORRECTING REQUESTS FOR SERVERLESS FUNCTIONS

CROSS-REFERENCE TO RELATED APPLICATION

This patent application is a continuation of and claims priority to U.S. patent application Ser. No. 16/846,111, filed Apr. 10, 2020, which is fully incorporated herein by reference.

TECHNICAL FIELD

The present disclosure relates generally to serverless cloud computing using anycast or another one-to-one-of-many routing methodology.

BACKGROUND

Serverless functions, or "microservices," are short programming functions hosted by cloud computing companies ("cloud providers") that perform a directed task when requested by a client via the Internet. "Serverless" means that the cloud provider dynamically manages the allocation and provisioning of servers for running the functions. The serverless functions run in stateless and transitory computing containers that are request-driven and completely managed by the cloud provider, with the serverless function owner paying only for those resources used during an invocation of a serverless function.

To provide their characteristic benefits, serverless functions are designed for high availability and reliable uptime by being redundantly populated by the hosting cloud providers at physical locations around the world at interconnected data centers to scale to any volume of incoming requests over the network. This is beneficial because client-side requests are responded to with as little latency as possible. But there may still be some latency in fulfilling client requests despite the strength and flexibility of such automated systems and their inherent scalability. For example, a serverless function that is infrequently used may not be running (may not be "hot") or, may not be ready to run (may not be "warm") at a given server node. If the serverless function is not already loaded and ready to run, the server node must "warm up" the serverless function by creating a working environment ("container" or "sandbox") for the function, or otherwise gather and start the specific resources needed for the function to execute, such as allocating memory space, calling up a runtime environment, assigning permissions, network access, and so forth.

DESCRIPTION OF EXAMPLE EMBODIMENTS

Overview

Figure 1:
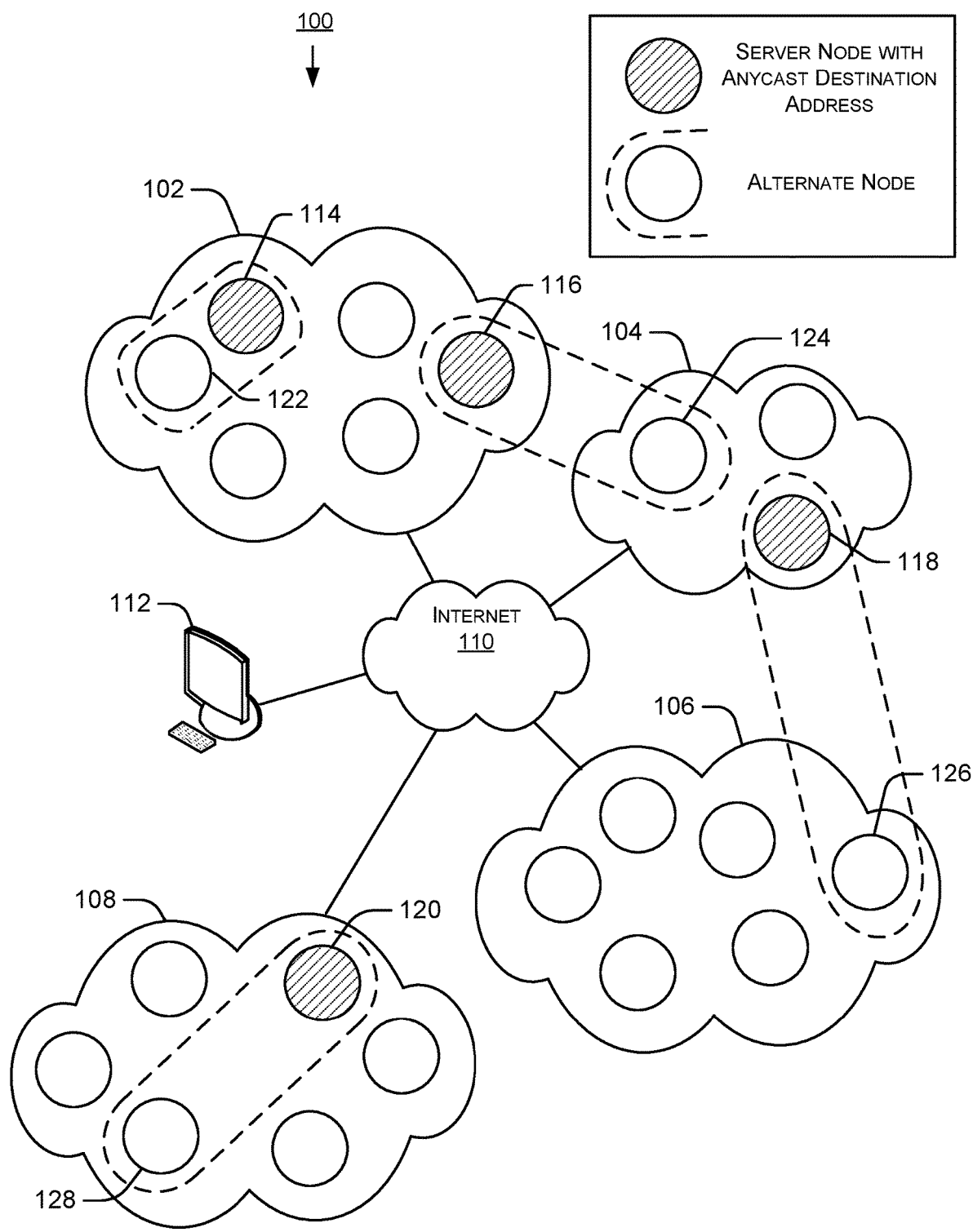
FIG. 1 is a diagram of an example serverless cloud computing network hosting the subject matter described herein.

This disclosure describes methods and architecture for reducing latency of serverless computing in a cloud computing network that uses a one-to-one-of-many routing methodology. An example process at a server node of the cloud computing network includes preloading an identity of an alternate node of the cloud computing network for running the serverless function, the identity of the alternate node stored in a memory as an identified alternate node, receiving a request at the server node from a client node to run the serverless function, then at the server node, determining that the server node is not currently running the serverless function or determining that the server node is currently overloaded. Based on determining that the serverless function is not currently running at the server node or based on determining that the server node is currently overloaded, the server node redirects the request to the identified alternate node without assessing a state of the identified alternate node.

In an example process, the identified alternate node can be a node of the cloud computing network topologically nearest to the given server node of the cloud computing network. Upon determining at the server node that the serverless function is not currently running at the server node or upon determining that the server node is currently overloaded, the request may be redirected directly to the identified alternate node as a proxy server on behalf of the client node. Upon determining at the server node that the serverless function is not currently running at the server node or upon determining that the server node is currently overloaded, the example process may respond back to the client node in a single hop with the identity of the identified alternate node for the client node to redirect the request to the identified alternate node.

An example process may warm up the requested serverless function at the server node when the server node redirects the request to the identified alternate node. The warming up is executed in anticipation of receiving a subsequent instance of the request for the serverless function from the client node or from another client node. The warming up can include creating a container, infrastructure, or working environment for the serverless function and starting specific resources needed for the serverless function to execute. After warming up the serverless function, an example process maintains the serverless function in a ready-state for a predetermined interval of time after the request from the client node or maintains the container, infrastructure, or working environment in a ready-state for currently running the serverless function for the predetermined interval of time in anticipation of receiving a next instance of the request for the serverless function from the client node or from another client node. The interval of time may be predetermined for maintaining the serverless function in a ready-state or for maintaining the container, infrastructure, or working environment for currently running the serverless function in a ready-state, based on a likelihood of a subsequent request for the serverless function at the server node. At the server node, while redirecting requests for multiple serverless functions to the identified alternate node, an example process may warm up and maintain the recently requested multiple serverless functions in a ready-state for respective predetermined intervals of time as a cache of prepared and ready serverless functions for a subsequent request for any of the recently requested multiple serverless functions.

The server node may create a list of alternate nodes topologically close to the server node, and blindly select the identified alternate node from the list of alternate nodes without regard for a state of the identified alternate node and without assessing the alternate nodes on the list. At the identified alternate node, a process may determine that the requested serverless function is not currently running at the identified alternate node or may determine that the identified alternate node is currently overloaded, and redirect the request for the serverless function back to the server node. The identified alternate node can redirect the request for the serverless function back to the server node where the serverless function has been warming up.

At the identified alternate node, an example process may determine that the requested serverless function is not currently running at the identified alternate node or may determine that the identified alternate node is currently overloaded, and the identified alternate node may route the request to a subsequent alternate node having an identity loaded at the identified alternate node, without regard for a state of the subsequent alternate node, and limit redirects of the request to a predetermined number within a chain or a ring of identified alternate nodes.

An example server device for a cloud computing network that hosts serverless functions comprises at least a processor and a memory, a front-end part of the server device for receiving a request for a serverless function from a client device, a backend part of the server device or node comprising a function engine for creating a working environment and resources for running the serverless function, and a referral component in the front-end part of the server device for directing the request to a function engine in the backend part of a server device located anywhere in the world.

Example Embodiments

This disclosure describes methods and architecture for load-correcting requests for serverless functions and subsequent responses. Since serverless functions are autoscaled with redundant code deployments, cloud providers can programmatically scale the elastic infrastructure needed for their operation up or down in an automated manner. Moreover, serverless function code most often has stateless logic, so that redundant instances remain consistent across different clients. Likewise, the hosting cloud providers usually have many data centers, or points-of-presence, around the world, each data center containing numerous proxy servers, so that the content provided from a geographically distributed content delivery network (CDN) is on at least one physical server that is within a reasonable distance from any given end user anywhere in the world. Along with the content to be delivered, the hosting cloud provider also redundantly deploys relevant serverless functions to the same data centers around the world and implements all networking logic needed. This is beneficial because client-side requests are responded to with as little latency as possible.

But depending on circumstances, there is still some latency in fulfilling client requests despite the strength and flexibility of such automated systems and their inherent scalability. For example, a serverless function that is infrequently used may not be running or may not be ready to run at a given server node. The spinning-up or warming up process can take hundreds of milliseconds, which can add to cumulative latency in responding to client requests that involve the serverless function.

Anycast is a resilient network addressing and routing method well-suited for content delivery networks (CDNs), in which incoming requests can be routed to a variety of different, redundant, candidate nodes in one or more locations, but opted into a group, each of the candidate nodes bearing the same destination address. Requests are routed to any one of the interchangeable potential receivers and can theoretically be fulfilled by any of them, so anycast routing is a one-to-one-of-many paradigm. With anycast, there are multiple possible destinations and the network itself picks the route and destination most currently favorable, usually selecting the geographically nearest data center with capacity to process the request, by default. Routers may also select an optimal path based on the number of hops, overall distance, lowest cost, latency measurements or based on the least congested route. In this way, anycast networks bring CDN content closer to any given client regardless of location. This selective routing also allows an anycast network to be flexible and robust for large request volumes during high traffic, during network congestion, and during various denial-of-service attacks.

But despite the advantages of one-to-one-of-many routing paradigms like anycast, serverless functions can cause significant latency if they are not already loaded when a request comes in, even in an anycast network. The aim of a serverless system is to ensure that requests are fed to servers and locations where the function is loaded. This can be hard to achieve with anycast-based routing to servers at the ingress of a request, as might be found with Internet-facing HTTP(S) services. An anycast network that is hosting serverless functions is still vulnerable to significant latency at individual server nodes when the individual server node is overloaded, or when the requested serverless function is not warm and ready-to-run at that node.

In an implementation, when a client requests a serverless function on the Internet (e.g., the "cloud"), the server receiving the request applies example routing techniques described herein that are based on the server's own status. If the server has the serverless function warm and ready to run, and has capacity, then the server simply executes the function. Otherwise, in one variation, the receiving server hands-off the request to a pre-identified alternate server node, without assessing the status of the alternate server node that is next to receive and host the request. While this hand-off may seem like a blind redirect, the redirect provides some advantages and a surprising decrease in overall latency of a larger network with resulting increase in the speed at which serverless functions are served.

The server initially receiving the client request knows whether the requested serverless function is already running or warmed up in its own backend function engine. The server also knows its own capacity. Even when the requested serverless function is currently warm at the server, the server may also know that it is too busy or overloaded to respond in reasonable time. Based on this self-knowledge, and without further communication outside itself, the server may hand-off the request without further computational overhead or decision-making.

The referral of the request, sometimes without assessing the new destination, successfully lowers latency on average, based on various probabilities and by dropping the overhead involved in trying to decide what to do next. Whatever the status of the identified alternate node, the referring server is already one-hundred percent certain that it cannot fulfill the request itself. By relaying the request to a pre-identified alternate (and using little or no overhead, and minimal or no hops in the decision to do so) the request remains "fresh" because the server initially receiving the request effectively becomes part of the pipeline of the initial request en route to a destination where the serverless function is actually warm and ready to run, instead of the server becoming a stopping point where various possible destinations are assessed and various heuristics applied to determine a best route or outcome. These conventional assessments and heuristic optimizations require some time and computational overhead in and of themselves, which the example devices described herein aim to eliminate.

Even if the alternate node where the request is being referred to is also busy, overloaded, or does not have the serverless function warm, the alternate node still has a better theoretical probability of fulfilling the request than the referring server, where the chances of immediately running the serverless function are already known to be zero.

Example processes based on this principle can be extended further. After determining that it does not have the requested serverless function warm, or determining that the server is busy or overloaded, a given server node that redirects the request to an identified alternate node may begin to spin-up the serverless function itself, even though it has redirected the request to an alternate server node. This initiation of a container for warming up the serverless function that it passed forward can serve at least two purposes. In an implementation, the server warms up the serverless function based on likelihood that there is some significant probability of subsequent requests for the same serverless function. This tendency for requests to repeat within a short timeframe from one or more clients holds true because the cause or event that prompted a client to request the serverless function usually lasts for a given duration or affects more than one client.

Additionally, the referring server itself warms up the serverless function after redirecting the request forward because in some implementations the alternate node may be programmed to redirect the request back to the referring server when the alternate node is also busy, overloaded, or does not have the serverless function warm. By the time the referring server receives back the request, the server may have the serverless function warm, since it has been initiating an environment for the serverless function during the referral process. During the referral out to the alternate node and the redirect back to the initial server, little or no time is lost over the initial server just keeping the request and warming up the serverless function to execute locally, with the added chance that when the alternate node has capacity and has the serverless function warm, there is an appreciable improvement in speed and reduction in latency over many instances of this scenario repeating on a larger network.

The example techniques herein may be considered an improvement over conventional anycast routing in the context of hosting serverless functions, or may be considered a good use of conventional anycast, or can be considered an improvement to similar routing paradigms such as round-robin DNS, or any network steering technique where multiple routes to a service are operable. Anycast, as an example, is one example of a one-to-one-of-many addressing and routing scheme used in serverless computing, but the description herein is not limited to anycast.

Example hardware for a cloud computing architecture includes example server nodes outfitted to perform the example methods and techniques. Significantly, the front-ends of the example devices described herein can refer to a backend function engine that is not necessarily co-located, the front-end of an example device may refer to a backend function engine in a different location.

This front-end/backend relationship is different from conventional server nodes, which redirect requests between front-ends of respective conventional server nodes, each conventional server node availing of its own function engine or a local function engine via the data access layer, running the requested function with arguments passed and returning the result via the front-end to the client. Conventionally, function steering usually happens in the network steering level by balancing the load across multiple front-ends in different locations, and, by using a routing scheme like anycast, the load may be balanced over the set of front-ends at the nearest location. There may be more than one front-end in a location, but all will refer the request to a function in the same location based on some balancing heuristic.

The example devices described herein, on the other hand, have front-ends that can refer to a backend function engine in any location.

FIG. 1 shows an example cloud computing network 100 with data centers 102, 104, 106, & 108 at different geographical locations but all within the larger Internet 110. When a client device 112 makes a request that invokes a serverless function, a one-to-one-of-many routing protocol, such as anycast or another protocol, can direct the request to any one of a group of server nodes 114, 116, 118, and 120 that form a group of candidate destination nodes for running the serverless function. The serverless function may perform a task such as delivering content or returning some other kind of response.

Example techniques can reduce latency of the serverless computing in such a cloud network 100. In a basic implementation, server nodes 114, 116, 118, and 120 are each preloaded or otherwise associated with an identity of a respective alternate node, such as server nodes 122, 124, 126, and 128. An alternate node 124 does not have to be in the same geographical location as its server node 116. On the other hand, an alternate node 122 can be in the same data center 102 as its server node 114, for example. Before any client requests are received by a server node 116, the only "link" between a server node 116 and its associated alternate node 124 is knowledge of the identity of the alternate node 124 that stored at the server node 116.

In some implementations, associations between server node 116 and alternate node 124 are stored in the network, in networking devices of the cloud 100 but not the server node 116 itself. There is no special or contrived physical link between the server node 116 and its associated alternate node 124 other than their mutual participation in the cloud computing network 100 and assignment of their IP and machine addresses under IP and routing protocols. However, in an implementation, a routing scheme such as anycast may be used to find or designate respective alternate nodes 124 in the first place. Also, there is nothing inherently "alternate" about an alternate node 124, each alternate node is just another server node that has been designated as an alternate with respect to another server node 116. In one variation, a group of server nodes 114, 116, 118, & 120 may all associate themselves to the same single alternate node (e.g., node 124).

When a given server node 116 receives a request from a client node 112 that involves execution of a serverless function, the server node 116 may self-determine that it is not currently running the serverless function and does not have it ready to run (function is not warm), or the server node 116 may determine that it is overloaded or at least too busy to serve the function, even if the server node 116 determines that it has the serverless function warm and ready to run, were it not overloaded. Of course, if the server node 116 has the serverless function ready to run and has capacity to do so, then it simply runs the serverless function as requested.

But if the server node 116 does not have the serverless function warm, then the server node 116 redirects the request directly to the identified alternate node 124 without assessing a state of the identified alternate node. Importantly, the server node 116 does not waste any time or overhead communicating about this hand-off of the request, and does not perform any decision-making, which would likewise spend time and resources, creating the overhead responsible for network latency. In one sense, by directly referring the request, the unable server node 116 just becomes part of the initial pipeline of the initial request, insofar as possible, without become a stopping point on the trajectory from client device 112 to a cloud device (alternate node 124) that has the serverless function warm, and ready to serve.

In many cases, the routing protocol in operation will have identified alternate nodes that are geographically or topologically nearest to the given server node 116 that is making the hand-off, but not always. Moreover, there are many variations in the way that the server node 116 can redirect a request that it cannot handle itself, if it does not have the requested serverless function immediately ready. For example, in an implementation, the server node 116 redirects back to the client device 112 with a message containing the identity of the alternate node 124, or a short list of alternate nodes. While this is not as fast as making a direct referral since it involves extra hops, it is still an improvement over just sending back a "dead end" or "too busy" message to the client device 112. In another implementation, the server node 116 redirects the request to the identified alternate node 124 as a proxy server on behalf of the client node, with responses coming back to the client device 112 via the original server node 116 as middleman, instead of responses being sent directly from alternate node 124 to client device 112.

An example computing network 100 with infrastructure for running serverless functions has the server nodes, such as nodes 114 and 116, communicatively coupled with each other, each server node 114 & 116 having one or more processors and one or more non-transitory computer-readable media, for example, storing computer-executable instructions that, when executed by the one or more processors, cause the one or more processors to: load an identity of an alternate node 112 of the cloud computing network 100 for running a serverless function, the identity of the alternate node 122 to be stored as an identified alternate node 122. The computer-executable instructions further instruct the one or more processors to: receive a request from a client node 112 of the cloud computing network to run the serverless function, determine that the serverless function is not currently running at the server node 114 or determine that the server node 114 is currently overloaded, and based on determining that the serverless function is not currently running at the server node 114 or based on determining that the server node 114 is currently overloaded, redirect the request to the identified alternate node 122 without assessing a state of the identified alternate node 122.

In an implementation, a server node 116 is built with a front-end for handling the client requests and a backend function engine for warming up and invoking the serverless functions. But the server node 116 is also endowed with logic and ability to refer requests directly to the function engine of a different server node 124, even if that server node 124 is in a different geographical location than the referring server node 116. This provides advantages over conventional cloud devices, which route requests only between the front-ends of server nodes in various locations. An example of this architecture is shown next, in FIG. 2.

Figure 2:
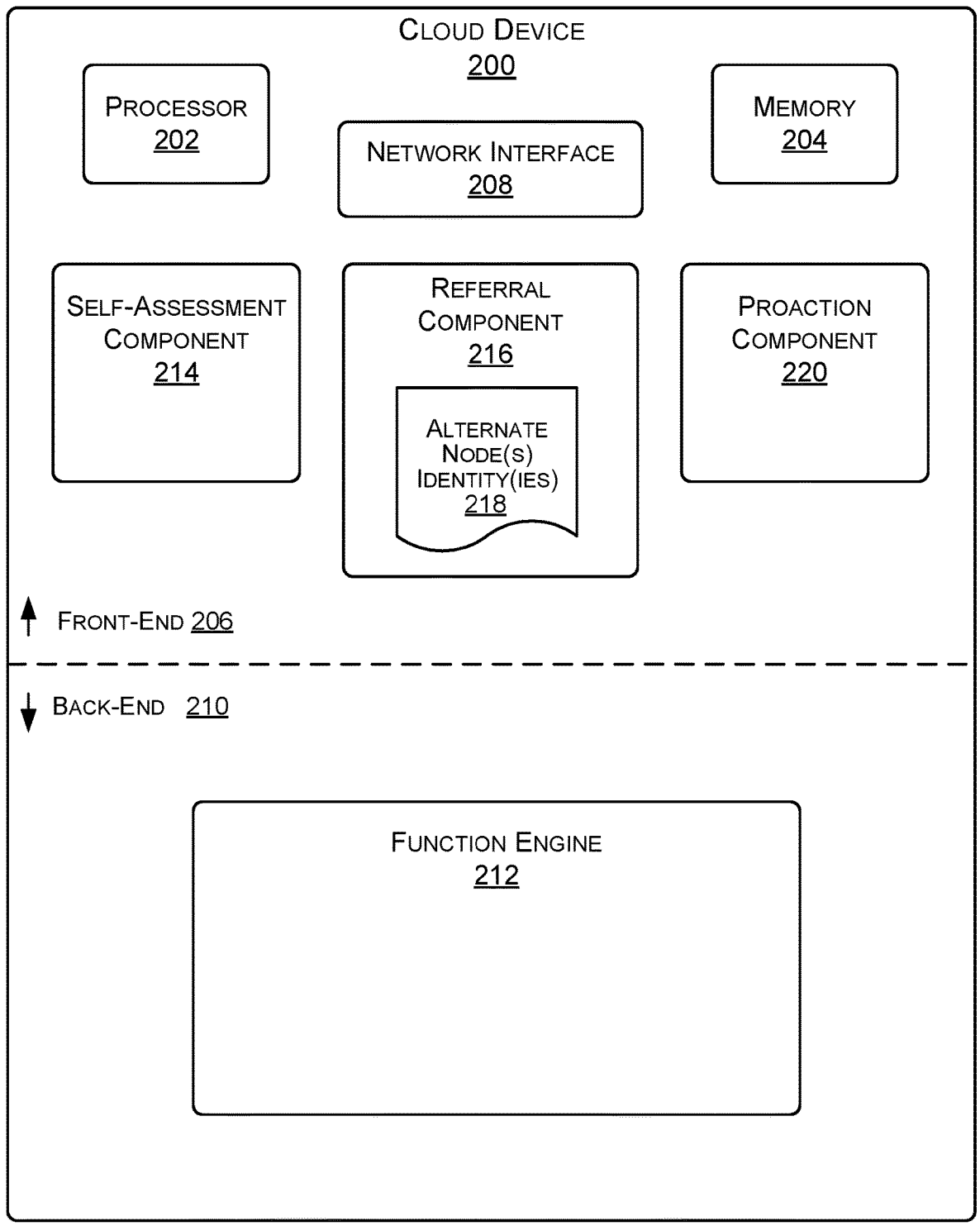
FIG. 2 is a diagram of an example cloud device with a front-end redirecting server and a backend serverless system in a single component.

FIG. 2 shows an example cloud device 200, which can be a server node 116 or even another type of network device such as a router, hybrid device, and so forth. The example device 200 has processor 202 and memory 204 hardware, a client-facing front-end 206 with a network interface 208, and a backend 210 that has a function engine 212 for preparing resources for running serverless functions and for running the serverless functions. The front-end 206 may have a self-assessment component 214, which can apply conventional logic for determining onboard capacity and for tracking which serverless functions are running or prepared to run, or, the cloud device 200 may depend on the network 100 and its protocols for knowledge of at least some statuses of the cloud device 200. The self-assessment component can also contain custom logic suited specifically for the example operations described herein.

The front-end 206 of the example cloud device 200 handles and redirects client-side requests, such as requests in hypertext transfer protocol (HTTP) for representational state transfer (REST), and the backend 210 is co-located, including a local backend function engine 212 for warming up and running providing execution of those serverless functions that the front-end 206 accepts. The front-end 206 determines from a request which function should be called and what arguments should be passed using rule-matching, for example. The front-end 206 then forwards to the backend function engine 212 which is normally co-located. The function engine 212 runs the requested function with the arguments and returns the result via the front-end 206 to the client device 112.

The front-end 206 may also include an example referral component 216, which executes the example referral and redirection processes and techniques described herein and has capacity to store the identity(ies) 218 of one or more alternate node(s) 124. It should be noted that the referral component 216 does not have to be limited or exclusively associated with only the front-end 206 of the cloud device 200 but can be considered backend accessible. The referral component 216 may store the identity of only one alternate node 124, or may create a list of alternate nodes 122, 124, 126, & 128, for example those topologically close to the server node 116 from which a single alternate node 124 can be selected for reference to. In an implementation, a single alternate node 124 is blindly selected from a list of alternate nodes without regard for a state of the identified alternate node 124 and without assessing the alternate nodes 122, 124, 126, & 128 on the list.

Conventional function steering usually occurs at the network steering level by balancing the load across multiple front-ends 206 in different locations. By using anycast routing, for example, the load may be balanced over a set of front-ends 206 at the nearest location. There may be more than one front-end 206 in a location, but all front-ends 206 at that location will refer the request to a serverless function in the same location based on a given balancing heuristic. The referral component 216 of the example cloud device 200 by contrast, however, can refer the request for the serverless function to a function engine 212 in any geographical location, anywhere in the world.

Accordingly, an example server node 116 for a cloud computing network hosting serverless functions may include at least a processor and a memory, and a front-end part 206 of the server node 116 for receiving a request for a serverless function from a client device. A backend part 210 of the example server node 116 has a function engine 212 for creating a working environment and resources for running the serverless function. A referral component 216 in the front-end part 206 of the example server node 116 directs the request to the function engine 212 in the backend part 210 of a server node in any location in the cloud computing network. The referral component 216 can be programmed to direct the request from the client device to a pre-identified alternate node 218 of the cloud computing network without assessing a status of the pre-identified alternate node 218. The server node 116 directs the request based on the server node 116 being busy or not having the serverless function ready to run.

The example server node 116 may have a proaction component 220 in the front-end part 206, the proaction component 220 configured to create a working environment and resources for running the serverless function and configured to invoke the serverless function, while the request for the serverless function is being directed outside the server node 116 to the pre-identified alternate node 218.

In one scenario, the front-end 206 directs to a local function engine 212, but the function engine 212 declines with a second preference function engine 212 of an alternate node 124, which may be still be co-located or may be elsewhere (node 126) in a different geographical location. The function engine 212 itself may rule itself out base on not having the serverless function warm. The function engine 212 can forward the request or can return the approximate equivalent of an HTTP redirect. The function engine 212 can also not make the referral but instead leave the front-end 206 to make the redirect. In an implementation, the redirect specifies that a next request to a function engine 212 is second preference and should not be further redirected.

The front-end 206 may rule out a local function engine 212 internally based on shared information and may choose an alternate node 124 as a second preference, either by preference ordering or at random. The alternate node 124 as second preference might be local but can also be remote (for example, node 126 with respect to server node 116).

The front end 206 of a server node 116 may completely decline a request by redirecting to a remote front-end, such as server node 120. Such a referral may happen based on the serverless function not being warm locally, may occur after some predetermined number of instances of not having the function warm, or may occur based on front-end 206 or site loading.

When a serverless function is used to serve an HTTP request, the sequence of events may go in one of two ways:

Path 1: when there is no serverless function prepared to take the request, because all instances are occupied or there is no instance available:

The request is received and via URL routing the correct serverless function to call is determined.

This serverless function is loaded into a (typically newly created) serverless environment, which is usually newly created, such as a container, and creation of the container and starting of the containing process can cause hundreds of milliseconds of delays.

The request is passed to the serverless function inside wrapper code.

The serverless function runs.

The result is returned via HTTP connection.

Path 2: when the serverless function remains warm in memory:

The request is received and via URL routing the correct serverless function to call is determined.

The warm instance of the serverless function instance is identified.

The request is passed to serverless function inside wrapper code.

The serverless function runs.

The result is returned via HTTP connection.

The second path above gives good results. The first path above can add a great deal of latency, and in a large system this latency is undesirable. The example cloud device 200 has several ways of mitigating this latency, which means more frequently finding a loaded serverless function, and forcing the code onto the second path, without running an excessive number of instances.

When path 1 above occurs, the referral component 216 can route the request to an alternate server node 124, and the new host may also have no instances of the required serverless function currently running. The request may be diverted to the alternate node 124 using a temporary redirect. In an implementation, the alternate node 124 as new host may be chosen deliberately because it has capacity in the specific function, or in another implementation the alternate node 124 may be chosen at random on the basis that it is more likely to have capacity in the function than the referring server node 116 (which definitely does not have current capacity). If the destination alternate node 124 has capacity in the serverless function, then path 1 is converted into path 2 with just an additional redirect.

The identity(ies) of the alternate node(s) 218 to redirect to can be determined in one of the following ways:

1. At random—this has a low probability of success for infrequently demanded functions.

2. Using a ring as in FIGS. 9-10 below—any given server node 116 always redirects to the next host in the ring. Additionally, if the next host in the ring starts a copy of the function when the request comes in, it is better prepared for further requests.

3. By consulting with a central system or software component for the best redirect to use. This has higher latency to response, but a central software component can piece together a system overview and redirect to locations known to be running the serverless function being requested.

The cloud device 200 may also have a proaction component 220 for warming up a serverless function even as the referral component 216 redirects a client request for invoking the serverless function outside itself. The proaction component takes advantage of the knowledge that if one request is received more are likely to follow, which is common for serverless functions. The proaction component 220 prepares an environment, resources, and permissions to warm-up a serverless function in anticipation of a repeated instance of the request from the same or a different client device 112, or in situations where the client request returns to the referring cloud device 200, as described in FIGS. 7-8 below.

The proaction component 220 of the redirecting server node 116, with knowledge that further requests for the serverless function are now likely, may choose to start running the function within a newly created container or sandbox, or otherwise adjust capacity in the requested serverless function. Warming up the serverless function now means that the server node 116 will be ready for the likely requests that follow, optimizing those future requests to path 2 above without the redirect.

If the serverless function is also not available on the directed-to alternate node 124, then the serverless function may be started, leading to the worst-case scenario of path 1 with an added redirection.

Figure 7:
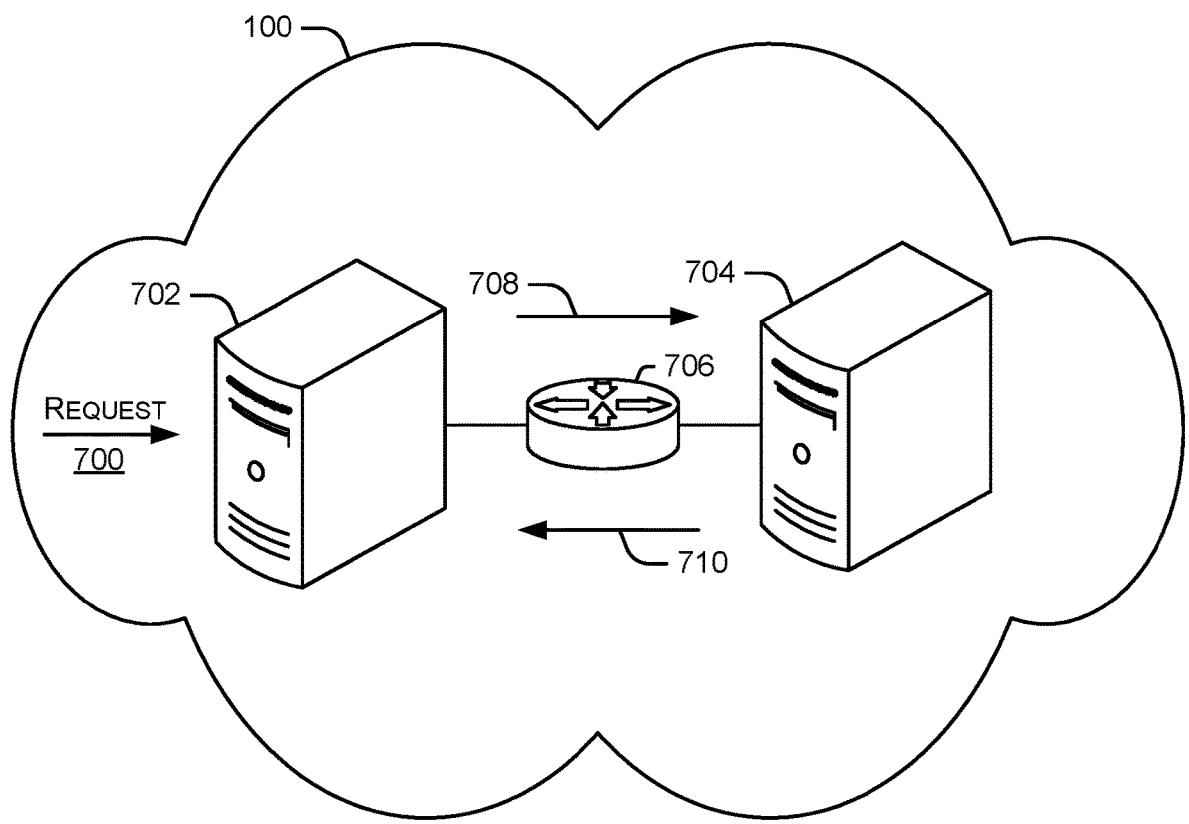
FIG. 7 is a diagram of an example serverless cloud computing network in which a first server node is communicatively coupled with a second server node through various Internet and cloud devices.
Figure 8:
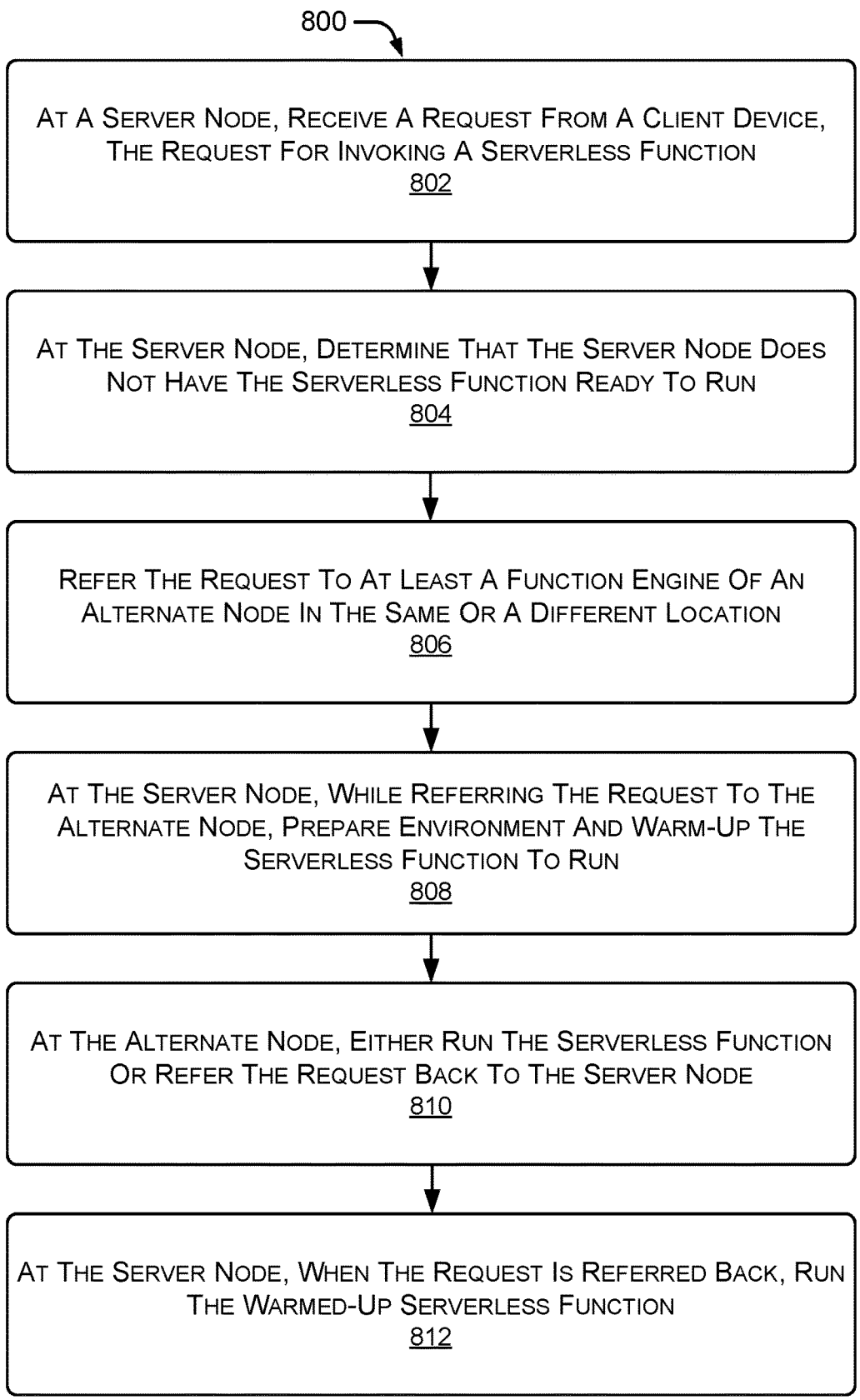
FIG. 8 is a flow diagram of an example process embodying the example shown in FIG. 7.

In an implementation, another option is for the directed-to alternate node 124, when it does not have the serverless function warm, to redirect back to the original server node 116 with an additional marker in the URL indicating no further redirections are to occur, as shown and described in FIGS. 7-8. This is path 1 above with two redirections. However, if the proaction component 220 preemptively started the function during the initial redirect, the redirections occur while a function is simultaneously being loaded and started, so this is unlikely to cause additional delay to response over path 1 as originally described, because the time taken to redirect would otherwise have been taken up with the loading process, which can run to hundreds of milliseconds.

Figure 3:
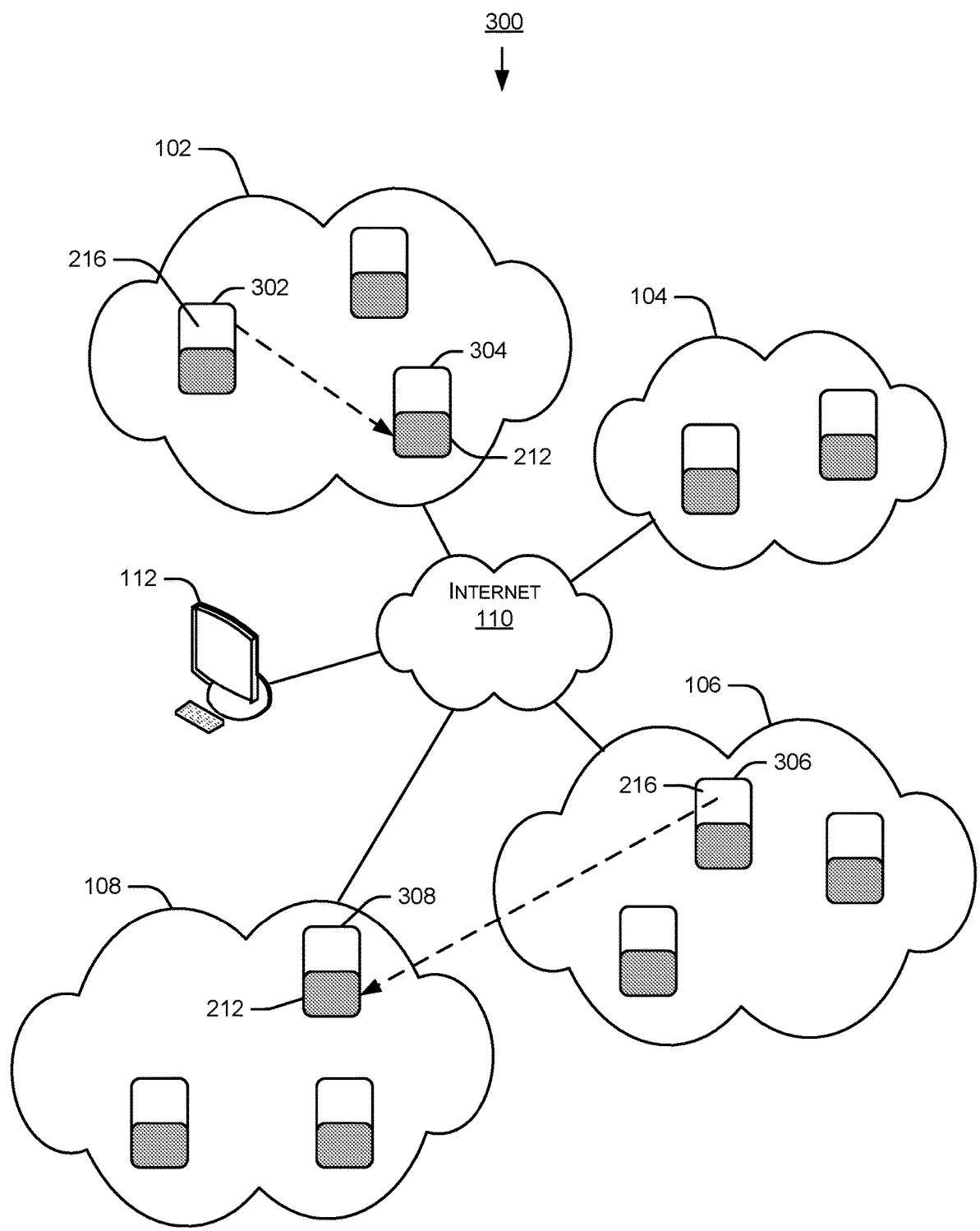
FIG. 3 is a diagram of an example serverless cloud computing network hosting instances of the cloud device of FIG. 2.

FIG. 3 shows an example cloud computing network 300 populated with at least some instances of the example cloud device 200 of FIG. 2. In FIG. 3, server nodes 302, 304, 306, & 308 are instances of example cloud device 200. The cloud computing network 300 of FIG. 3 has data centers 102, 104, 106, & 108 in separate geophysical locations, but all participating in the Internet 110 as a serverless cloud computing system.

When server node 302 receives a request from the client device 112 invoking a serverless function, the server node 302 determines that it does not have the serverless function prepared and ready to run, and in response the referral component 216 of server node 302 refers the client request to the function engine 212 of server node 304, which in this case is a different server machine residing in the same data center 102 as server node 302.

In an implementation, the referral component 216 of server node 302 refers the client request directly to the function engine 212 of server node 304 without any assessment of the statuses and capacity of server node 304 and without the overhead of any decision-making regarding the referral. Following this seemingly blind hand-off of the client request, it may turn out that alternate server node 304, in turn, also cannot handle the client request because it does not have the requested serverless function prepared and ready to run, but it may also turn out that server node 304 does have the serverless function ready, and fulfills the client request, at great improvement in speed and reduction of latency over server node 302 simply responding to the client device 112 that it cannot run the serverless function (so try elsewhere), or making the client device 112 wait, while the server node 302 spin-ups the serverless function itself.

In a further example in FIG. 3, server node 306 in data center 106 receives a request from the client device 112 invoking a serverless function, and the server node 306 determines that it does not have the serverless function prepared and ready to run. In response, the referral component 216 of server node 306 refers the client request to the function engine 212 of server node 308 in data center 108, which in this case is a different server machine residing in a different data center 108 in a different geographical location than server node 306 in data center 106. This can be contrasted with conventional redirection of requests, limited to interactions between front-ends 206 of different conventional server nodes.

Figure 4:
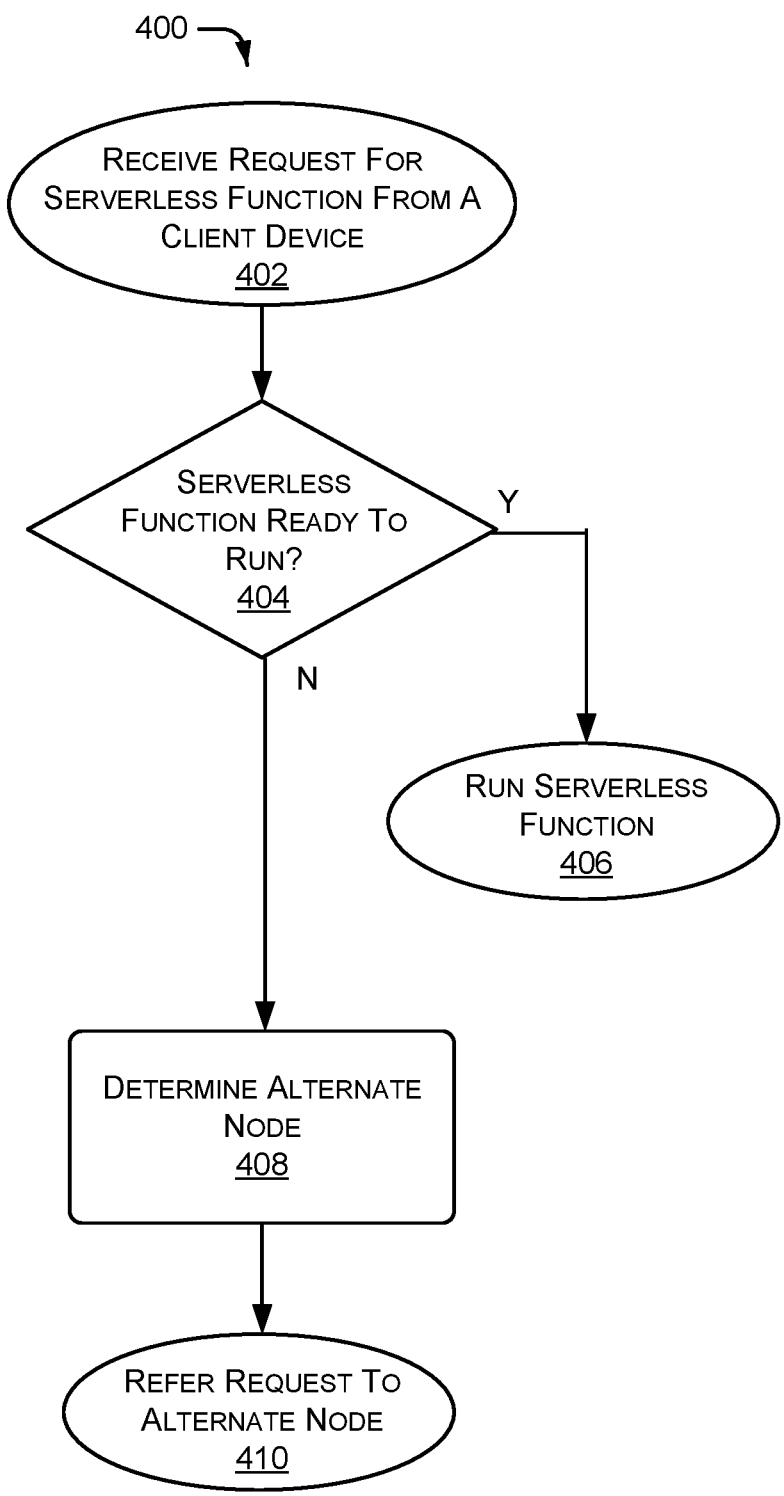
FIG. 4 is a flow diagram of an example process for reducing latency in a serverless cloud computing network.

FIG. 4 is a flow diagram of an example process 400 for reducing latency in a serverless cloud computing network. Operations of the example process 400 are shown in individual blocks in the flow diagram and can be performed by instances of the example cloud device 200 of FIG. 2 and instances of its example components, such as the example referral component 216 and the example function engine 212.

At block 402, a request from a client device is received at a server node to run a serverless function on the cloud computing network.

At block 404, the server node assesses whether the serverless function is prepared and ready to run at the server node.

If the serverless function is prepared and ready to run at the server node, then at block 406 the server node runs the serverless function and the process 400 ends.

If the serverless function is not prepared and ready to run at the server node, then at block 408 the server node, network, another device, or another process determines an alternate node.

At block 410, the server node, network, another device, or another process refers the request to the identified alternate node.

Example process 400 embodies a basic series of operations for directing a client request for a serverless function to an endpoint in the cloud 100 that can immediately run the serverless function because the serverless function is warm at the endpoint and the endpoint has capacity to run it. Thus, the example process 400 is a method for running a serverless function as quickly as possible on the cloud 100 by routing requests for the serverless function to devices 200 that can run the serverless function without delay.

Figure 5:
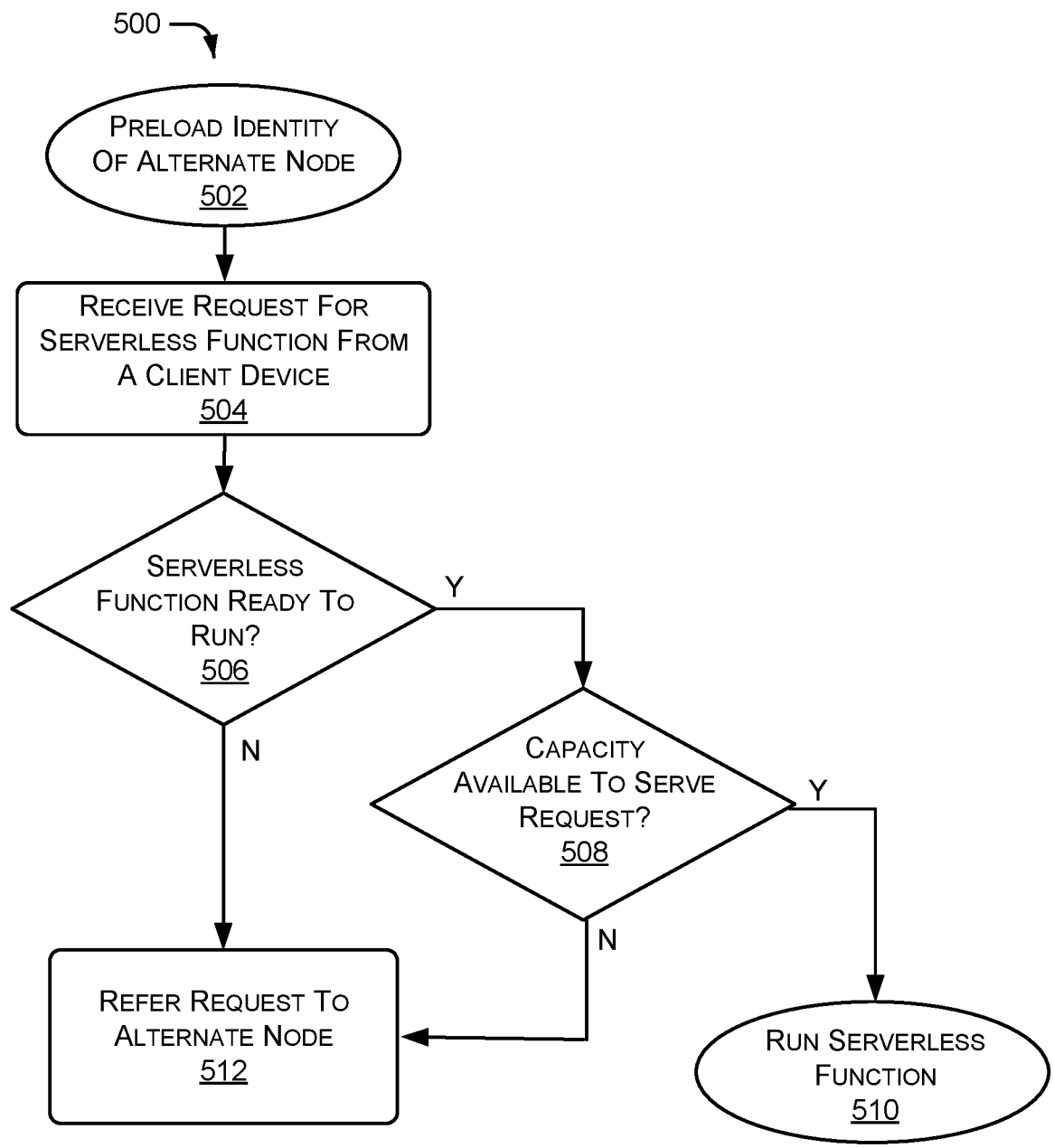
FIG. 5 is a flow diagram of another example process for reducing latency in a serverless cloud computing network, varied from the example process of FIG. 4.

FIG. 5 is a flow diagram of another example process 500 for reducing latency in a serverless cloud computing network that is slightly different than example process 400 in FIG. 4. Operations of the example process 500 in FIG. 5 are shown in individual blocks in the flow diagram and can be performed by instances of the example cloud device 200 of FIG. 2 and instances of its example components, such as the example referral component 216 and the example function engine 212.

At block 502, an example server node preloads the identity of an alternate node. The alternate node can be any cloud destination, but selected for similarity to the server node itself, or can be identified by IP or routing protocols.

At block 504, the server node receives a request for a serverless function from a client device.

At block 506, the server node assesses whether the serverless function is prepared and ready to run at the server node.

If the server node has the function warmed up and ready to run, then at block 508, the server node further assesses whether the server node has capacity to run the serverless function, even though the serverless function is available, since running one or more instances of the serverless function might occupy an entire bandwidth of the device.

If the server node also has capacity, then at block 510 the server node runs the serverless function.

If the server node does not have the serverless function ready to run at block 506, or if the server node does not have capacity at block 508, then at block 512 the server node refers the client request to the alternate node using the identity preloaded at block 502.

Example process 500 embodies the efficiency of a direct referral of the client request to a destination more likely to fulfill the request, without applying assessments, heuristics, or decision-making in order to find the alternate node: the identity of the alternate node is preloaded as "foreknowledge," obviating the overhead and delay that would be involved in trying to find an optimal next routing path.

Figure 6:
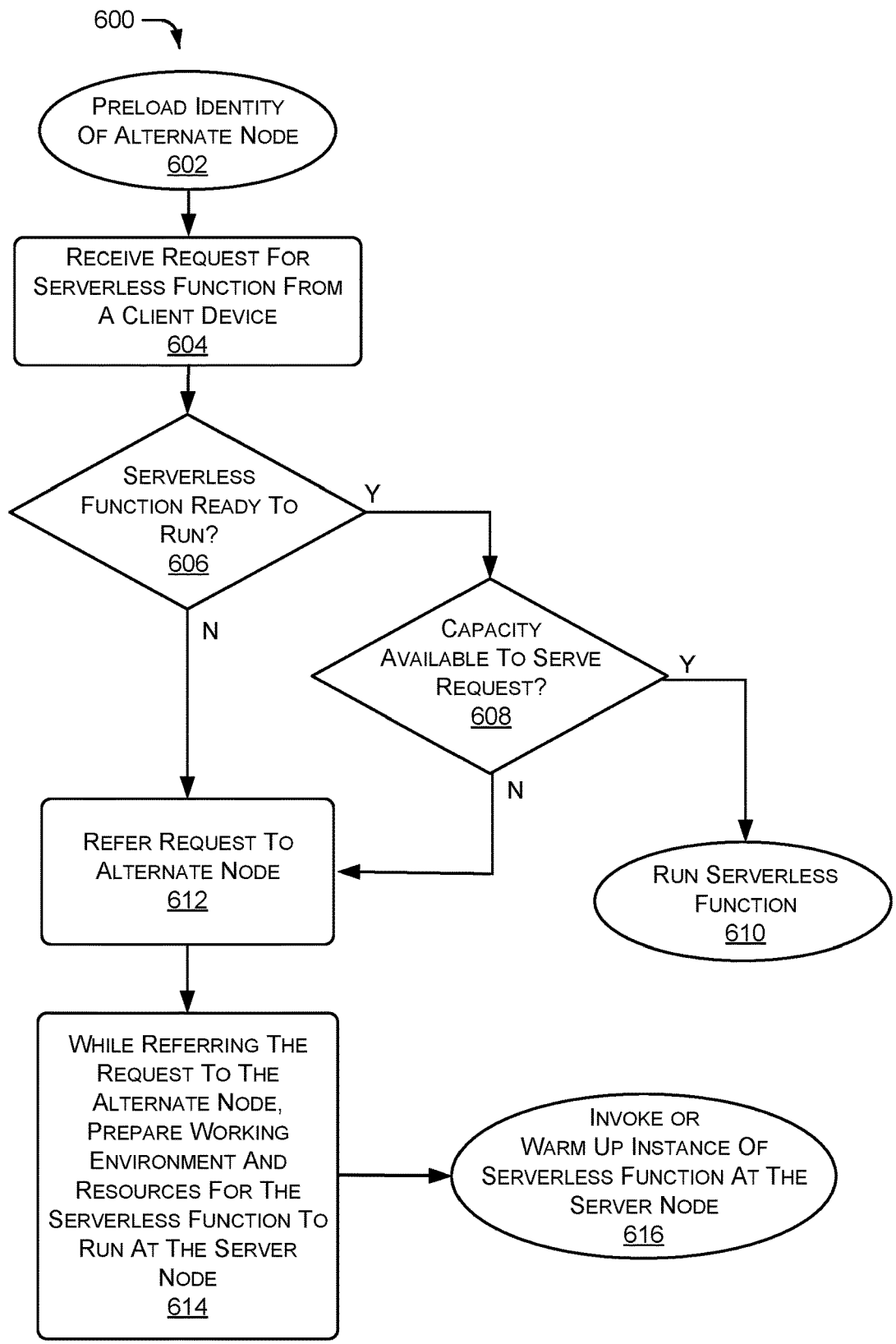
FIG. 6 is a flow diagram of another example process for reducing latency in a serverless cloud computing network, varied from the example processes of FIGS. 4-5.

FIG. 6 is a flow diagram of another example process 600 for reducing latency in a serverless cloud computing network. Operations of the example process 600 are shown in individual blocks in the flow diagram and can be performed by instances of the example cloud device 200 of FIG. 2 and instances of its example components, such as the example referral component 216 and the example function engine 212.

At block 602, an example server node preloads the identity of an alternate node. The alternate node can be any cloud destination that can run serverless functions as the server node does.

At block 604, the server node receives a request for a serverless function from a client device.

At block 606, the server node assesses whether the serverless function is prepared and ready to run at the server node.

If the server node has the function warmed up and ready to run, then at block 608, the server node further assesses whether the server node has capacity to run the serverless function, even though the serverless function is available, since running one or more instances of the serverless function might occupy an entire bandwidth of the device.

If the server node also has capacity, then at block 610 the server node runs the serverless function.

If the server node does not have the serverless function ready to run at block 606, or if the server node does not otherwise have capacity to fulfill the request at block 608, then at block 612 the server node refers the client request to the alternate node using the identity preloaded at block 602.

At block 614, simultaneous with referring the request to the alternate node at block 612, or nearly at the same time as the referral is made, the server node prepares a working environment for the serverless function that was requested, including gathering resources, setting up permissions, allocating memory, and storing arguments and variables received with the request.

At block 616, the server node warms up an instance of the serverless function proactively. This spinning-up of the serverless function may take place slightly before or after the referral of the request to the alternate node at block 612. Preparing an instance of the serverless function anticipates that a repeat request will arrive, based on practice and probability. In an implementation, the proactive preparation of an instance of the serverless function also anticipates that the same request might return from the alternate node being referred to, when the system is set up that way, as in the next FIG. 7.

The server node may maintain the serverless function or a running environment for the function in a ready-state for a predetermined interval of time. This may include maintaining the container, infrastructure, or working environment for the serverless function for the interval of time. The server node may determine the interval of time for maintaining the serverless function in a ready-state based on a calculated likelihood of receiving a subsequent request for the serverless function at the server node. The server node may also redirect multiple requests for multiple different serverless functions in a short time span, warming up and maintaining multiple serverless functions in a ready-state for respective predetermined intervals of time as a cache of prepared and ready serverless functions, when a subsequent request arrives for any of the recently requested serverless functions.

FIG. 7 shows an example serverless cloud computing network 100 in which a first server node 702 is communicatively coupled with a second server node 704 through various Internet and cloud devices, such as one or more routers 706. Through an internet protocol, routing protocol, or other devise or procedure, the first server node 702 identifies the second server node 704 as an alternate node for itself, according to the example process 600 shown in FIG. 6. Upon receiving a request 700 from a client device 112 that calls for a serverless function, the first server node 702 becomes self-aware that it does not have the serverless function ready to run at the time of the request 700. The first server node 702 warms up the serverless function and transmits 708 the request 700 directly to the second server node 704 with no intervening search for the second server node 704 and no other hesitation due to processing or calculation, as in example process 600 of FIG. 6. Upon receiving the request 700 at the second server node 704 (FIG. 7), the second server node 704 determines that it too does not have the serverless function prepared and ready to run, and so transmits 710 the request back to the first server node 702. The first server node 702 now has the requested serverless function prepared and ready to run, and begins to fulfill the request 700, or else has a head start in warming up the serverless function over the second server node 704.

Although the referral of the request 700 to the second (alternate) server node 704 and then back to the first server node 702 may seem like a waste of energy or a futile attempt, this is not so across the servicing of multiple instances of a request 700. With respect to latency in fulfilling the client request 700 little or no time has been lost by referring the request and receiving it back over the first server node 702 just keeping the request 700 and waiting for the serverless function to warm up, since that is what happens anyway, conventionally. On the other hand, interjected into the waiting time for the serverless function to warm up, is a hand-off of the request 700 to a potentially more able server node 704 which, when successful, essentially eliminates the delay of waiting for the serverless function to warm up. As a paradigm across an entire serverless cloud computing network 100 or CDN, this example technique provides a surprising reduction in overall latency in fulfilling client requests 700.

FIG. 8 shows an example process 800 embodying the example technique shown in FIG. 7, also based on the process shown in FIG. 6. Operations of the example process 800 are shown in individual blocks in the flow diagram and can be performed by instances of the example cloud device 200 of FIG. 2 and instances of its example components, such as the example referral component 216 and the example function engine 212.

At block 802, at a server node, a request from a client device is received for invoking a serverless function.

At block 804, at the server node, it is determined that the server node does not have the serverless function ready to run.

At block 806, the request is referred to at least a function engine of an alternate node in the same or a different geographical location.

At block 808, while referring the request to the alternate node, the server node prepares an environment and warms up an instance of the serverless function that was requested.

At block 810, the alternate node either runs the serverless function immediately if the serverless function is warmed up or refers the request back to the server node.

At block 812, when the request is referred back to the server node, the server node runs the warmed-up serverless function without further referral outside itself.

Figure 9:
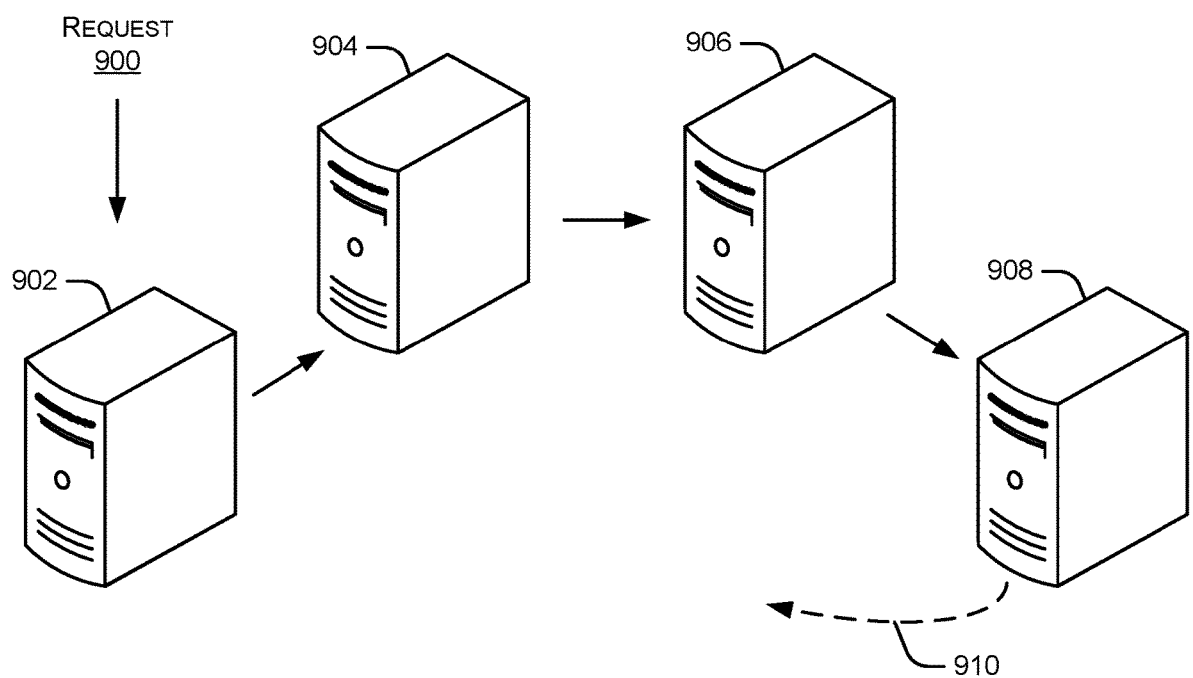
FIG. 9 is a diagram of an example network configuration within a serverless cloud computing network for immediately routing a request that invokes a serverless function as quickly as possible to a device that has the serverless function warm and ready to run.

FIG. 9 shows another example network configuration within a serverless cloud computing network for immediately routing a request 900 that invokes a serverless function as quickly as possible to a device that has the serverless function warm and ready to run.

A first server node 902 receives the initial client request 900 and determines that the serverless function is not locally prepared to run using its own backend function engine 212. The first server node 902 then refers the request to a second server node 904, and when each server node 902, 904, 906 . . . 908 in a ring or a chain of server nodes likewise does not have the serverless function prepared and ready to run, the hand-offs of the request 900 continue up to a predetermined number. Of course, if a server node in the ring or chain has the function ready, that server node runs the function and the referrals end. The multiple server nodes in a ring or chain may be in different geographical locations. It should be noted that the referrals or hand-offs of the request 900 from one server node to the next is effectively instantaneous with respect to deciding the identity of the next server node in the ring or chain to refer to. The only remaining latency in the entire ring or chain of server nodes is the determination at each server node 902 that that node does not have the serverless function prepared to run, which is usually state information currently available at each server node, available without computational overhead.

An example system as shown in FIG. 9 may be preprogrammed so that only a limited number of referrals are implemented, before the current server node is mandated to run the serverless function in any case. In a variation, the request 900 traverses multiple server nodes in a ring or chain of unable server nodes until at a predetermined number of hand-offs, the request reverts 910 to the first server node in the ring or chain, which has been warming up the serverless function during the multiple referrals. An extension or argument attached to the referral itself 900 may increment with each hand-off up to the predetermined maximum number, and/or may also carry the identity of the first server node in the ring or chain, which is known to be the earliest server node warming up the serverless function, in case an ultimate referral-back is needed. In the system shown and described in FIGS. 7-8, the default number of referrals to an outside alternate server node that may reside in any location is only one, for example, a "there-and-back" scheme, but a higher number of hand-offs can also be used.

Figure 10:
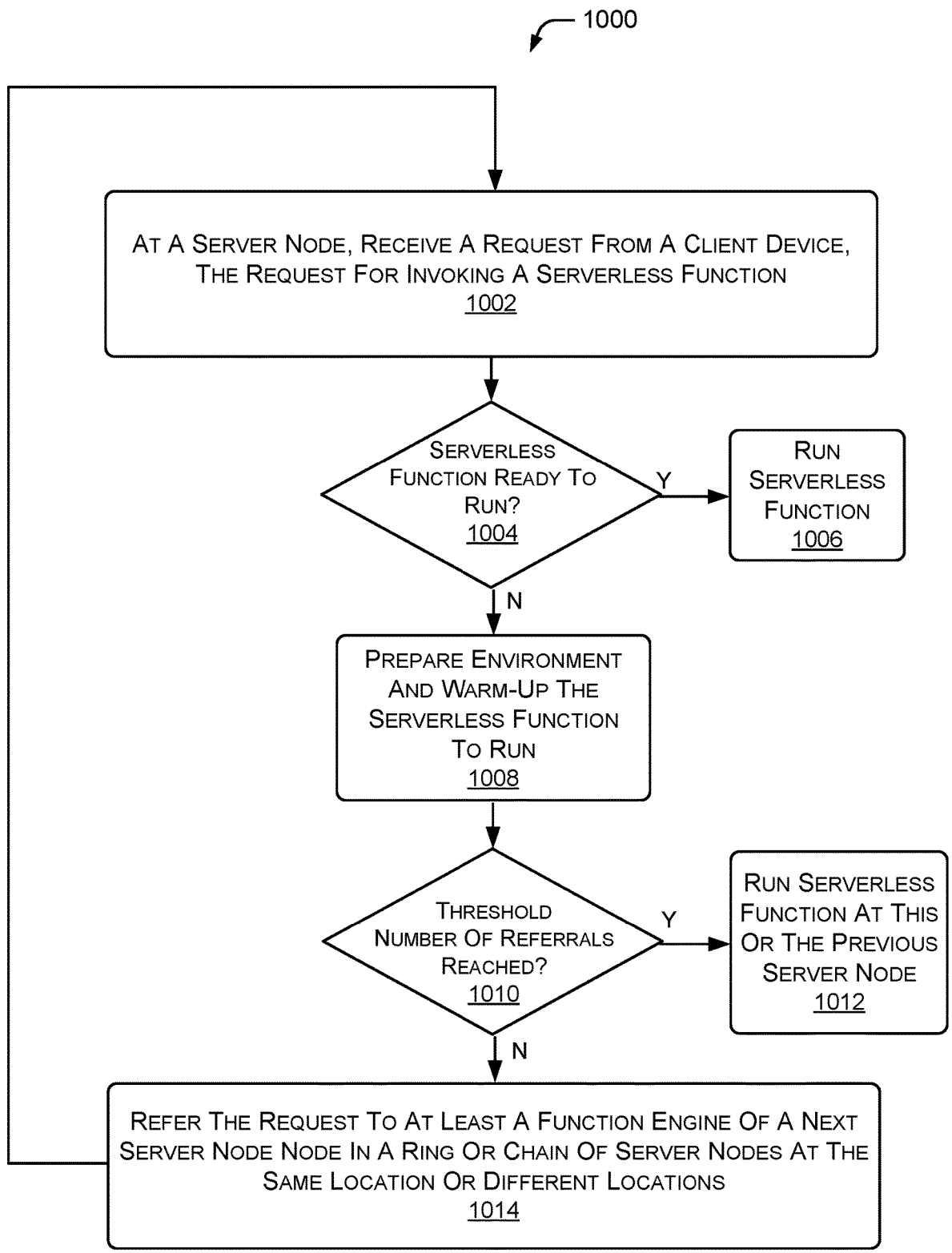
FIG. 10 is a flow diagram of an example process operable on the cloud network configuration shown in FIG. 9.

FIG. 10 shows an example process 1000 embodying the cloud network configuration shown in FIG. 9. The example process 1000 refers the client request to multiple server nodes in a ring or a chain en route to a device that has the serverless function warm and can quickly respond to the request without delay of spinning-up the function. The example process 1000 may limit the number of hand-offs to a predetermined quantity, at which point the cumulative time elapsed including further hand-offs would supersede the time needed for the first server node in the ring or chain to just spin-up the serverless function with no hand-offs. Operations of the example process 1000 are shown in individual blocks in the flow diagram and can be performed by instances of the example cloud device 200 of FIG. 2 and instances of its example components, such as the example referral component 216 and the example function engine 212.

At block 1002, a request from a client device is received at a server node to run a serverless function on the cloud computing network.

At block 1004, the server node assesses whether the serverless function is prepared and ready to run at the server node.

If the serverless function is prepared and ready to run at the server node, then at block 1006 the server node runs the serverless function and the process 1000 ends.

If the serverless function is not prepared and ready to run at block 1004, then at block 1008 the process 1000 prepares an environment and warms-up the serverless function to run.

At block 1010, the process 1000 determines how many times, if any, the request has been referred to an alternate node. Each referral in a sequence of referrals may self-identify how many referrals of the request have been made.

If the threshold number of referrals has been made, then at block 1012 the serverless function is spun-up and run at the current server node. In a variation, the process 1000 refers the request back to the first server node in a ring or chain of nodes, which has been warming up the serverless function since the request was first sent from the client device 112. If the threshold number of referrals has not been reached at block 1010, then at block 1014 the process 1000 refers the request to at least a function engine of a next server node in the ring or chain of server nodes, restarting and incrementing the process 1000 at block 1002. The server nodes in a ring or chain may reside in different geographical locations, as the process 1000 tries to quickly find a server node that has the requested serverless function prepared and ready to run.

As a load balancing technique, a given server node of the cloud computing network, upon receiving a request to run a serverless function, determines that the server node is too overloaded to run the serverless function, and blindly redirects the request to a predetermined alternate node without regard for a capacity of the alternate node. The server node may determine that it is not too overloaded to run the serverless function but nonetheless, the serverless function is not currently running at the server node. The server node then redirects the request to the predetermined alternate node while warming up the requested serverless function in anticipation of a subsequent request for the serverless function.

After warming up the requested serverless function, the node may maintain the serverless function in a prepared and ready state for an interval of time, the interval of time based on a probability of receiving a subsequent request for the serverless function.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

The invention claimed is:

1. A method comprising:
   receiving, at a first node of a network suitable for running a serverless function, a request for the first node to run the serverless function;
   determining, by the first node, that the first node is not currently optimized to run the serverless function; and
   based at least in part on determining that the first node is not currently optimized to run the serverless function, redirecting the request to a second node of the network without assessing whether the second node is currently optimized to run the serverless function.

2. The method of claim 1, further comprising, at the first node and prior to receiving the request, preloading an identity of the second node for running the serverless function, the identity of the second node stored in a memory as an identified alternate node.

3. The method of claim 1, wherein determining that the first node is not currently optimized to run the serverless function comprises determining that, the serverless function is not currently running at the first node.

4. The method of claim 1, wherein determining that the first node is not currently optimized to run the serverless function comprises determining that the first node is currently overloaded.

5. The method of claim 1, wherein the network is a cloud computing network, the first node is a first server node of the cloud computing network, and the second node is a second server node of the cloud computing network.

6. The method of claim 1, wherein the second node is a node of the network that is topologically nearest to the first node of the network.

7. The method of claim 1, wherein the request to run the serverless function is received from a client node and redirecting the request to the second node of the network comprises one of:
   redirecting the request directly to the second node as a proxy server on behalf of the client node; or
   responding to the request with an identity of the second node such that the client node redirects the request to the second node.

8. The method of claim 1, further comprising warming up the requested serverless function at the first node after redirecting the request to the second node, the warming up in anticipation of receiving a subsequent request for the first node to run the serverless function.

9. The method of claim 8, wherein warming up the requested serverless function comprises creating a container, infrastructure, or working environment for the serverless function.

10. The method of claim 8, further comprising:
    after warming up the requested serverless function, maintaining the serverless function in a ready state for a period of time after the request;
    during the period of time, receiving, at the first node, another request for the first node to run the serverless function; and
    running the serverless function at the first node.

11. A first node of a network, the first node suitable for running a serverless function, the first node comprising:
    one or more processors; and
    one or more non-transitory computer-readable media storing instructions that, when executed by the one or more processors, cause the first node to perform operations comprising:
      receiving a request for the first node to run the serverless function;
      determining that the first node is not currently optimized to run the serverless function; and
      redirecting the request to a second node of the network based at least in part on determining that the first node is not currently optimized to run the serverless function.

12. The first node of claim 11, the operations further comprising, prior to receiving the request, preloading an identity of the second node for running the serverless function, the identity of the second node stored in a memory as an identified alternate node.

13. The first node of claim 11, wherein determining that the first node is not currently optimized to run the serverless function comprises at least one of determining that the serverless function is not currently running at the first node or determining that the first node is currently overloaded.

14. The first node of claim 11, wherein the second node is a node of the network that is topologically nearest to the first node of the network.

15. The first node of claim 11, wherein the request to run the serverless function is received from a client node and redirecting the request to the second node of the network comprises one of:
    redirecting the request directly to the second node as a proxy server on behalf of the client node; or
    responding to the request with an identity of the second node such that the client node redirects the request to the second node.

16. The first node of claim 11, the operations further comprising warming up the requested serverless function after redirecting the request to the second node, the warming up in anticipation of receiving a subsequent request for the first node to run the serverless function.

17. The first node of claim 16, wherein warming up the requested serverless function comprises creating a container, infrastructure, or working environment for the serverless function.

18. A first node of a network, the first node comprising:
    at least a processor and a memory;
    a first portion including a function engine that is capable of running a serverless function; and
    a second portion for receiving a request to run the serverless function, the second portion including a referral component for redirecting the request to another function engine of a second node of the network if the first node is not optimized to run the serverless function.

19. The first node of claim 18, wherein the function engine of the first portion of the first node is configured to create a working environment and resources for running the serverless function.

20. The first node of claim 18, wherein the referral component is configured to:
    determine whether the first node is optimized to run the serverless function based at least in part on whether the serverless function currently running at the first node or whether the first node is overloaded; and
    redirect the request to the second node of the network without assessing a status of the second node.

* * * * *